(12) United States Patent
Blöhbaum

(10) Patent No.: US 6,593,563 B2
(45) Date of Patent: Jul. 15, 2003

(54) OPTO-ELECTRONIC SENSOR ARRAY AND A METHOD TO OPERATE AN OPTO-ELECTRONIC SENSOR ARRAY

(75) Inventor: Frank Blöhbaum, Freiburg (DE)

(73) Assignee: Sick AG, Waldkirch/Breisgau (DE)

(*) Notice: Subject to any disclaimer, the term of this patent is extended or adjusted under 35 U.S.C. 154(b) by 0 days.

(21) Appl. No.: 09/866,554

(22) Filed: May 25, 2001

(65) Prior Publication Data
US 2002/0109073 A1 Aug. 15, 2002

(30) Foreign Application Priority Data
May 25, 2000 (DE) .......................... 100 25 897

(51) Int. Cl.[7] .................. G01J 1/42; H01L 27/00; G06K 9/00; G06K 9/54; G06K 9/20; G01B 5/28
(52) U.S. Cl. .............. 250/208.2; 250/208.1; 382/141; 382/304; 382/317; 702/40
(58) Field of Search ............... 250/208.2, 208.1, 250/205, 214 R, 214 C; 382/141, 304, 317; 702/28, 40

(56) References Cited

U.S. PATENT DOCUMENTS

| | | | |
|---|---|---|---|
| 4,902,886 A | * | 2/1990 | Smisko ................... 250/214 |
| 5,471,515 A | * | 11/1995 | Fossum et al. ............ 377/60 |
| 5,805,276 A | * | 9/1998 | Davis et al. ............ 356/124 |
| 6,057,539 A | * | 5/2000 | Zhou et al. ............ 250/208.1 |

* cited by examiner

Primary Examiner—David Porta
Assistant Examiner—David C Meyer
(74) Attorney, Agent, or Firm—Townsend and Townsend and Crew LLP

(57) ABSTRACT

A method is described for the operation of an opto-electronic sensor array, in which a plurality of sequential operating light pulses are emitted into a monitored region; the operating light pulses reflected from an object arranged in the monitored region are received by a spatially resolving receiver unit with a plurality of light sensitive sensors; the light intensity of the respectively received reflected operating light pulses is detected and stored in each case during an activation interval synchronously with the emission of the operating light pulses for each sensor; and after each activation interval, in sequential transmission steps, the light intensities stored for the sensors are transmitted to a parallel processor having a plurality of parallel signal inputs for the parallel signal processing, with the transmission in each case taking place for a plurality of sensors simultaneously in each transmission step. Furthermore, a sensor array for the carrying out of the method is described.

24 Claims, 2 Drawing Sheets

Figure 1:
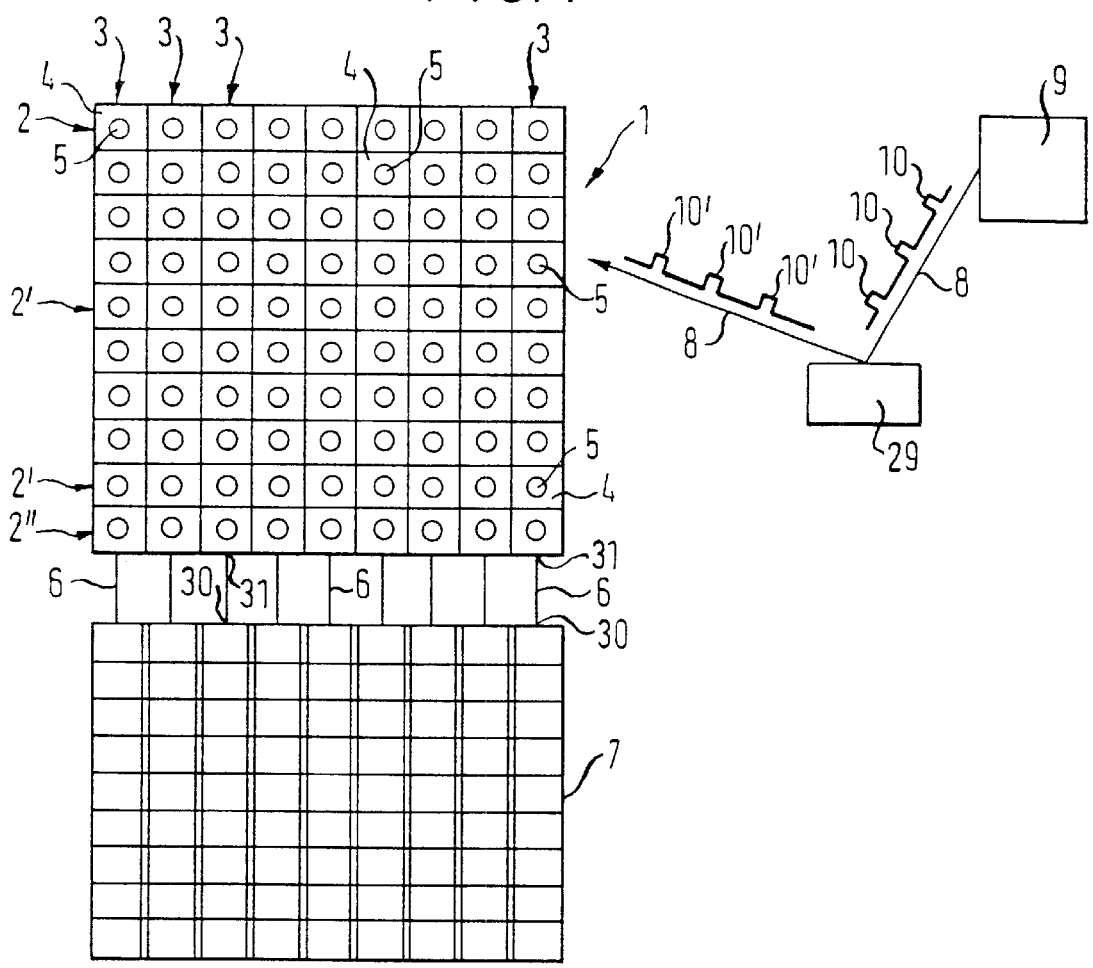

OPTO-ELECTRONIC SENSOR ARRAY AND A METHOD TO OPERATE AN OPTO-ELECTRONIC SENSOR ARRAY

The present invention relates to a method to operate an opto-electronic sensor array and to such a sensor array.

The intrusion of objects into a monitored region is recognized, for example, by such sensor arrays, wherein an object recognition can also take place, in addition to a pure object detection signal, for example by a contour detection with a corresponding sensor selection. Conventional camera systems with CCD based solutions are frequently used as the sensor systems. These are, however, only conditionally usable in an industrial environment due to their high sensitivity to external light. Moreover, such CCD based solutions usually have too low a processing speed as typical image rates of only less than 30 Hz can be achieved with them.

It is an object of the invention to provide an opto-electronic sensor array and a method to operate such a sensor array in which an improved external light suppression, in particular an improved continuous light suppression, is possible. Furthermore, a higher processing speed than with CCD base solutions should be possible with this sensor array.

The object relating to the method to operate an opto-electronic sensor array in accordance with the invention is satisfied by a method in which a plurality of sequential operating light pulses are emitted into a monitored region, the operating light pulses reflected by an object in the monitored region are received by a spatially resolving receiver unit with a plurality of light-sensitive sensors, the light intensity of the respectively received reflected operating light pulses is in each case detected and stored synchronously with the emission of the operating light pulses during an activation interval and the light intensities stored for the sensors are transmitted after every activation interval in following transmission steps to a parallel processor with a plurality of parallel signal inputs for parallel signal processing, with the transmission in each transmission step taking place in each case for a plurality of sensors simultaneously.

The part of the object relating to the apparatus is satisfied by an opto-electronic sensor array comprising a light transmitter for the transmission of a plurality of sequential operating light pulses into a monitored region and a spatially resolving receiver unit comprising a plurality of light sensitive sensors for the reception of operating light pulses reflected from an object arranged in the monitored region, a synchronizing unit for the synchronization of the operating light pulses with an activation interval in which the sensors can each be activated to detect the light intensity of the reflected operating light pulses received in each case, a memory unit in which the light intensity detected during the activation interval for each sensor can be stored and a parallel processor comprising a plurality of signal inputs which is connected to corresponding outputs of the receiver unit for the parallel acceptance of a plurality of values of the light intensities stored in the memory unit.

In accordance with the invention, the light incident on the sensors is thus only evaluated for each sensor during sequential activation intervals and the corresponding light intensity is stored, for example, in the form of charges in a capacitor, with these activation intervals being synchronous to the emission of the operating light pulses so that the amount of the light reflected at the respective object plus the background light incident at this moment in time is stored as the light intensity. Background light outside the activation interval and thus present between the end of an operating light pulses and the beginning of the next operating light pulses is thus not stored in the receiver unit.

In connection with the transmission of the stored light intensities for a part of the sensors in each case in sequential transmission steps, it is thus prevented that during the transmission of the light intensities for a first part of the sensors in a first transmission step a constant integration of the background light incident on these sensors takes place, whereby a falsification of the evaluation signals would take place.

An improved non-sensitivity to external light over known sensor arrays is achieved in this way. Furthermore, a much higher processing speed is achieved in comparison with usual sensor arrays by the parallel transmission of a plurality of light intensity values to a parallel processor and a corresponding parallel pre-processing of the transmitted signals. Processed image rates of 5,000 Hz and more can be realized in this way. With appropriately short operating light pulses, for example short laser pulses, the sensor arrangement formed in accordance with the invention and the corresponding method are also suitable for the detection of fast-moving objects, for example on assembly lines.

In accordance with an advantageous embodiment of the invention, no storage of the light intensities incident on the sensors takes place outside the activation intervals. In this way, only the reflected light originating from the operating light pulses, including the background light incident during the period of the operating light pulses, is stored. It is generally also possible for radiation energy incident on the sensors between the activation intervals to be detected and to be evaluated, for example for the additional blanking out of the background light. Such an evaluation, however, requires additional measures to distinguish between the effective light signal during the activation intervals and the interference signals disposed outside the activation intervals.

In accordance with a further preferred embodiment of the invention, a pre-processing of the light intensity values transmitted in a previous transmission step already takes place by the parallel processor during the transmission of the light intensity values. In this way, the overall processing speed can be further increased since the pre-processing of the reception signals and the transmission of the following signals takes place simultaneously. The pre-processing can, for example, be an additional suppression of interference signals, for example of background light or a part evaluation of the signals.

Each of the signal values pre-processed by the parallel processor are preferably fed to an evaluation unit for object recognition. With a corresponding evaluation unit, not only the recognition of an object, but also, for example, the detection of its shape is possible.

The light intensities can be stored for each sensor in analog form, for example in capacitors. However, it is also possible for a digital storage of the light intensities to be carried out.

If the light intensities are stored in analog form, an analog to digital conversion of the stored values takes place preferably before the transmission of the stored values to the parallel processor, which can in particular take place for a plurality of sensors simultaneously, with this analog to digital conversion advantageously taking place for each of the sensors simultaneously whose stored light intensity values are transferred to the parallel processor in the next transmission step.

In accordance with a further advantageous embodiment of the invention, the sensors are arranged two-dimensionally in lines and/or columns next one another in each case, with the value of the light intensities respectively stored for a line or a column being transferred to the parallel processor in each transmission step. Generally, any spatially resolving arrangement of the sensors is possible, for example line-shaped, matrix- shaped, circle-shaped, in particular in concentric circles, trapezoid shaped or in any other suitable manner. A three-dimensional arrangement of the sensors can also be advantageous for certain applications.

If the sensors are arranged in line, column or matrix shape, then the analog to digital conversion preferably takes place for all sensors of one line or one column simultaneously in each case. Typical figures for a matrix shaped arrangement can be 256×256 or 512×512 sensors.

In accordance with a further advantageous embodiment of the invention, relationships are evaluated in each case between the transmitted signal values of sensors arranged next to one another in the pre-processing by the parallel processor, with preferably an edge recognition signal being generated when the difference between the output signal values of sensors arranged next to one another exceeds a pre-set threshold value. The output signal of the parallel processor already pre-processed in this way can then be evaluated in a simple manner in a desired way in an evaluation unit.

The sensors are advantageously each only activated during the activation intervals to receive the reflected operating light pulses and the sensors are in particular deactivated synchronously with the end of the respectively emitted operating light pulses. If the length of the activating interval is selected in each case such that it corresponds to the length of the operating light pulses emitted synchronously thereto, then the activation interval and the emitted operating light pulses coincide in time such that light incident on the sensors between the operating light pulses is reliably blocked out.

The receiver unit is preferably formed as a sensor chip, in particular as a CMOS based sensor chip. Unlike CCD sensors, CMOS sensors can be read in parallel and can thus be used more flexibly. An analog or digital pre-processing of the selected values by the parallel processor is possible in this way.

Further advantageous embodiments of the invention are given in the dependent claims.

Figure 4:
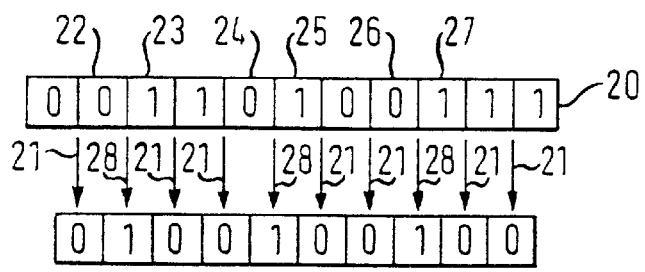
Figure 2:
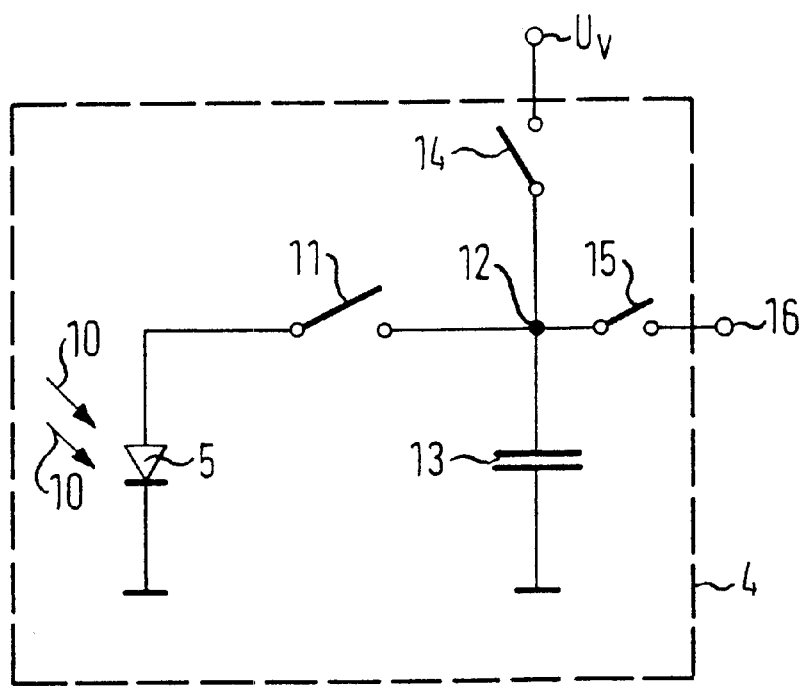
Figure 3:
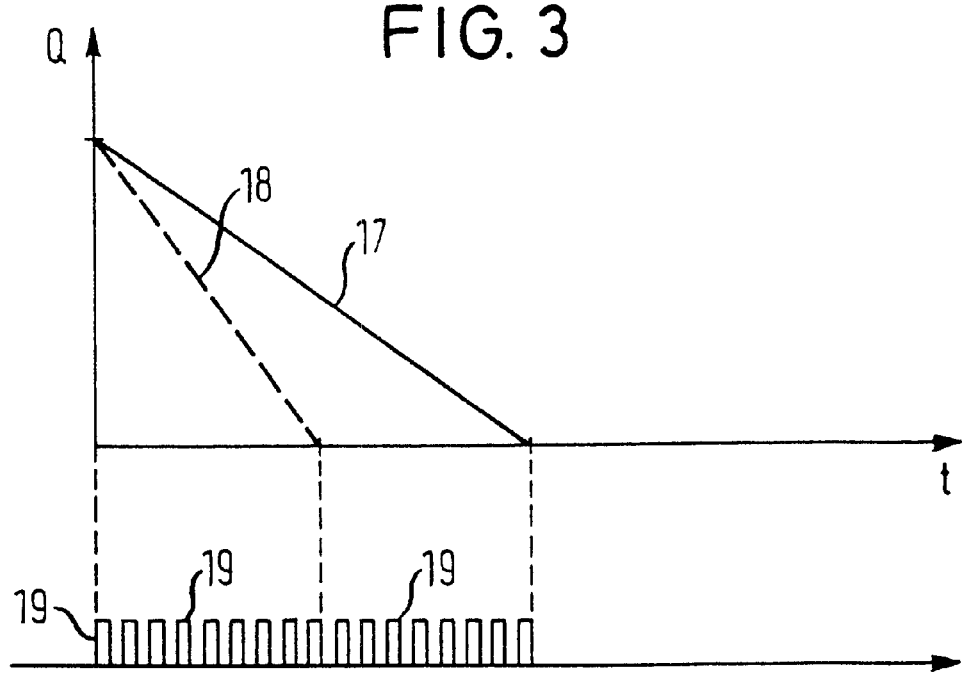

The invention is described in more detail in the following by means of an embodiment with reference to the drawing, in which are shown:

FIG. 1 a very simplified schematic representation of a receiver unit in accordance with the invention and of a processor field connected thereto;

FIG. 2 a schematic representation of a special embodiment of sensor of the receiver unit;

FIG. 3 a schematic representation for the digitization of the light intensity stored in a second; and FIG. 4 a schematic example for a pre-processing of the signal values fed to the parallel processor.

FIG. 1 shows a receiver unit 1 which comprises a plurality of sensors 4 arranged in matrix-shape, i.e. in lines 2, 2' and 2" and columns 3 and represented schematically as boxes. Each sensor 4 contains a light-sensitive element 5, for example a photodiode, and further elements shown in more detail in FIG. 2. The light sensitive elements 5 are formed for the detection of light signals 8 which are emitted as operating light pulses 10 into a monitored region by a light transmitter 9 and are reflected at an object arranged in the monitored region and are incident on the sensors 4 as reflected operating light pulses 10'.

Each sensor 4 has an output 16 (FIG. 2) which are connected to one another such that the output signals of the sensors 4 can be fed line by line from the signal outputs 31 of the receiver unit 1 to signal inputs 30 of a processor field 7 of a parallel processor via a plurality of lines 6.

Starting with line 2", the signal values stored in the sensors 4 of the individual lines can, as will be described below, be fed to the processor field 7 of the parallel processor after one another so that the latter can carry out a parallel, line-by-line signal pre-processing.

The sensors 4 can be controlled such that incident light is in each case only received and stored within a defined activation interval for all sensors 4 simultaneously. No storage of the incident light takes place outside an activation interval.

An example for a realization of the sensors 4 is shown in FIG. 2. Each of the sensors 4 comprises a light sensitive element 5 which is formed for the reception of the light signals 8. The light signals 8 are formed in accordance with the invention by the operating light pulses 10' reflected at the object 29 in the monitored region which are emitted after one another in time from the light transmitter 9 in the monitored region. The emission of the operating light pulses 10 is synchronized with the activation intervals such that the light intensity reflected at the object 29 and received by the light sensitive element 5 is only stored by the sensors 4 during the activation intervals and thus only during the time of emission of an operating light pulses 10, as is shown in the following.

The light sensitive element 5 is connected to ground with one connection and via a switch 11 to a nodal point 12 with its other connection. On the one hand, a memory element formed as a capacitor 13 is connected to ground at the nodal point 12 and, on the other hand, the nodal point 12 can be connected to the supply voltage $U_V$ via a reset switch and to the output 16 of the sensor 4 via a switch 15. The totality of the capacitors thus forms a memory unit of the receiver unit 1.

Prior to the start of an activation interval, i.e. prior to the emission of an operating light pulses 10, the reset switch 14 is closed, for example so that the capacitor 13 is charged with the supply voltage $U_V$. After the full charging of the capacitor 13, the reset switch 14 is opened and the switch 11 is closed directly before transmission of an operating light pulses 12, i.e. prior to the start of the activation interval, so that now the total light comprising the reflected operating light pulses 10' and any background light is incident on the light sensitive element 5 and results in a discharging of the capacitor 13. After the end of the activation interval, i.e. after the end of the respective operating light pulses 10, the switch 11 is opened again so that background light still incident on the light sensitive element 5 does not result in a change in the charge stored in the capacitor 13. This controlling of the switches 11 and 14 takes place synchronously for all sensors 4.

The charge now stored in the capacitor 13 or the difference between the initial charge and the charge now stored is a measure for the intensity of the sum of the radiating background light and of the reflected operating light pulses 10' incident on the light sensitive element 5 during the activation interval.

The intensity of the incident light stored in this way in each sensor 4 during the activation interval remains constant until the switch 11 is closed again synchronously with the emission of the next operating light pulses 10. A change in the stored light intensity, for example by incident background light, is avoided in this way.

Before the next operating light pulses 10 is emitted, the stored values of the light intensities are transmitted line by line in a plurality of sequential transmission steps by closing the switch 15 of a line 2 to the processor field 7 of the parallel processes and evaluated by it. Since the light intensity values stored in the sensors 4 do not change during the reading procedure due to radiation of the background light, the light intensities stored in the capacitors 13 of this line also represent values in the final transmission step, when reading the line 2, which correctly correspond to the values received at the point in time of reading of the first line 2".

The values are preferably subjected to an analog/digital conversion prior to or during the transmission of the stored light intensity values from the sensors 4 to the processor field 7. It is shown schematically in FIG. 3 how digital values can be determined, for example, for different light intensities. The line 17 shows the reduction in charge Q in the capacitor 13 over the time t with a low radiating light intensity, whereas the broken line 18 represents this profile for a higher light intensity radiating onto the sensor 4.

A plurality of period count impulses 19 are shown in the lower half of FIG. 3 which are emitted at a high frequency so that a plurality of the count impulses 19 arise during the discharge time of the capacitor 13 in accordance with the lines 17 and 18. Simply by counting these count impulses 19, conclusions can be made directly with respect to the discharge time of the capacitor 13 and thus in turn to the light intensity radiating onto the light sensitive element 5.

FIG. 4 shows an example in schematic form of how a pre-processing of the digitized signal values can be effected by the parallel processor while including neighboring relationships between adjacent signal values.

The signal values represented in a line 20 by the schematic values "0" and "1" and fed to the parallel processor are examined for climbing flanks by the parallel processor, i.e. as to whether the difference between adjacent values exceeds a certain threshold value. If this is not the case, the respective pixel transition is assigned the value "0" in each case, as is shown by the arrows 21.

If the threshold value is exceeded, as is the case for example with the pixels 22 and 23, 24 and 25 and 26 and 27, then these transitions are assigned the value "1", in accordance with the arrows 28, which thus in each case represents the occurrence of an edge of an object in the surveillance sector.

A column-wise analog/digital conversion and a column-wise further processing of the digitized data can naturally also take place instead of the described line-wise analog/digital conversion and the line-wise transmission and digital further processing of the digitized data. It is generally possible to feed any region of the receiver unit to the parallel processor in one transmission step in each case.

For the further suppression of interference, a correlated double sampling stage can be provided per sensor with which the in particular different offset values of the individual sensors are compensated, for example, due to different amplifications when MOSFET switches are used. Crosstalk between adjacent sensors 4 is also possible in the sensor array in accordance with the invention by an appropriate reset and anti-blooming structure.

It is thus possible to have a substantially improved insensitivity to external light with a simultaneous clear increase in the processing speed of the image data detected with respect to the known sensor arrays using the sensor array in accordance with the invention and the method in accordance with the invention.

| | |
|---|---|
| 1 | receiver unit |
| 2, 2', 2" | lines |
| 3 | columns |
| 4 | sensors |
| 5 | light sensitive elements |
| 6 | lines |
| 7 | processor field |
| 8 | light signals |
| 9 | light transmitter |
| 10 | operating light pulses |
| 10' | reflected operating light pulses |
| 11 | switch |
| 12 | nodal point |
| 13 | capacitor |
| 14 | reset switch |
| 15 | switch |
| 16 | output |
| 17 | line |
| 18 | line |
| 19 | count impulses |
| 20 | lines |
| 21 | arrow |
| 22–27 | pixel |
| 28 | arrow |
| 29 | object |
| 30 | signal inputs |
| 31 | signal outputs |

What is claimed is:

1. A method of operating an opto-electronic sensor array comprising:

directing a plurality of sequential operating light pulses into a monitored region during an activation interval; receiving operating light pulses reflected off an object arranged in the monitored region on a spatially resolving receiver unit having a plurality of light-sensitive sensors; determining a light intensity of the reflected operating light pulses and synchronously storing the light intensities during the activation interval while the operating light pulses are directed into the monitored region; following each activation interval, sequentially transmitting subsets each comprising a plurality of light intensity values to a parallel processor having a corresponding plurality of parallel inputs; and parallel processing the plurality of light intensity values of each subset.

2. A method in accordance with claim 1 wherein no storing of the light intensities takes place outside the activation intervals.

3. A method according to claim 1 wherein the light intensity values transmitted during a preceding transmission step are parallel processed while transmitting the light intensity values during a succeeding transmission step.

4. A method according to claim 1 including feeding an output generated during parallel processing to an evaluation unit and using the output for recognizing an object.

5. A method according to claim 1 including limiting receiving the reflected light pulses with the sensors to the activation interval.

6. A method according to claim 5 including terminating receiving the operating light pulses synchronously with an end of the activation interval.

7. A method according to claim 1 wherein a duration of the activation interval corresponds to a length of the operating light pulses directed into the monitored region.

8. A method according to claim 1 including an analog-to-digital conversion of the light intensity values and transmitting resulting digital light intensity values to the parallel processor.

9. A method according to claim 8 wherein the analog-to-digital conversion takes place simultaneously for the light intensity values from a plurality of sensors.

10. A method according to claim 1 including arranging the sensors in a two-dimensional grid of at least one of lines and columns arranged proximate each other, and wherein transmitting comprises transmitting the light intensity values for one of the lines and columns in a single transmission to the parallel processor.

11. A method according to claim 10 including a simultaneous analog-to-digital conversion of the light intensity values from all sensors in the one of the lines or columns.

12. A method according to claim 1 wherein parallel processing comprises evaluating relationships between light intensity values from sensors which are arranged next to each other.

13. A method according to claim 12 including generating an edge recognition signal when a difference between the intensity values from sensors arranged next to each other exceeds a predetermined threshold value.

14. A method according to claim 1 wherein storing the light intensities takes place in a receiver unit associated with each sensor.

15. A method according to claim 1 wherein storing the light intensities of the reflected operating light pulses comprises storing the light intensity for each sensor in one of a digital form and an analog form.

16. An opto-electronic sensor array for monitoring a region comprising a light transmitter for directing a plurality of sequential operating light pulses into the monitored region during an activation interval, a spatially resolving receiver unit having a multiplicity of light-sensitive sensors for receiving operating light pulses reflected off an object in the monitored region, a synchronization unit for synchronizing the operating light pulses with the activation interval and activating the sensors to detect a light intensity value of the reflected operating light pulses, a memory unit for storing the detected light intensity values for each sensor during the activation interval; and a parallel processor including a plurality of signal inputs corresponding to a plurality of outputs of the receiver unit for sequentially receiving light intensity value subsets each comprising a corresponding plurality of light intensity values for parallel processing the corresponding plurality of light intensity values of each subset.

17. An opto-electronic sensor array according to claim 16 including an evaluation unit for recognizing an object, the evaluation unit receiving the parallel processed light intensity values from the parallel processor for further signal processing.

18. An opto-electronic sensor array according to claim 16 wherein the receiver unit comprises a CMOS sensor chip.

19. An opto-electronic sensor array according to claim 16 wherein the sensors are arranged in one of a line, a column, a matrix, a circular line and a trapezoidal line.

20. An opto-electronic sensor array according to claim 19 wherein each line, column or matrix comprises a like number of sensors.

21. An opto-electronic sensor array according to claim 20 wherein the parallel processor includes a number of signal inputs which equals the number of sensors per line, column or matrix.

22. An opto-electronic sensor array according to claim 16 wherein the receiver unit and the parallel processor are integrally constructed with each other.

23. An opto-electronic sensor array according to claim 16 including a correlated double sampling stage assigned to each sensor.

24. An opto-electronic sensor array according to claim 23 wherein the correlated double sampling stages are formed for compensating different offset values associated with respective sensors.

* * * * *